United States Patent [19]

Teare

[11] 4,434,119
[45] Feb. 28, 1984

[54] METHOD FOR PRODUCING CONCRETE PANELS

[76] Inventor: John W. Teare, 26 Hollytree Ct., Hamilton, Ohio 45011

[21] Appl. No.: 316,146

[22] Filed: Oct. 29, 1981

Related U.S. Application Data

[63] Continuation-in-part of Ser. No. 126,192, Mar. 3, 1980, Pat. No. 4,298,413.

[51] Int. Cl.³ ............................ B28B 1/14; B28B 1/30; B28B 7/06
[52] U.S. Cl. .................................. 264/145; 264/213; 264/232; 264/333; 264/DIG.43
[58] Field of Search ............... 264/338, 145, DIG. 43, 264/333, 256, 232, 213; 249/115

[56] References Cited

U.S. PATENT DOCUMENTS

| | | | |
|---|---|---|---|
| 1,368,756 | 2/1921 | Ross | 264/DIG. 43 |
| 2,044,786 | 6/1936 | Harshberger | 264/DIG. 43 |
| 2,288,559 | 6/1942 | Ward | 264/338 |
| 2,516,453 | 7/1950 | Dobell | 264/338 |
| 3,231,657 | 1/1966 | Kalousek | 264/333 |
| 3,655,847 | 4/1972 | Morgan | 264/DIG. 43 |
| 3,957,937 | 5/1976 | Lovell | 264/DIG. 43 |
| 4,124,669 | 11/1978 | Urmston | 264/338 |
| 4,203,788 | 5/1980 | Clear | 264/DIG. 43 |

FOREIGN PATENT DOCUMENTS

| | | | |
|---|---|---|---|
| 5154610 | 7/1974 | Japan | 264/233 |
| 355133 | 3/1970 | U.S.S.R. | 264/DIG. 43 |

*Primary Examiner*—Willard E. Hoag

[57] ABSTRACT

The invention provides a process for producing fabric-reinforced, thin concrete panels suitable as a backer board for construction materials such as ceramic tile, slate or thin brick. A process is described whereby the components of the panel are deposited on a web of release-agent-treated, water-absorbent paper while moving on a conveyor belt to form a continuous strip, the strip is cut into panels and the wet, uncured panels are stacked by means of an air-float stacking unit, then subsequently cured with the paper web between adjacent panels.

4 Claims, 4 Drawing Figures

METHOD FOR PRODUCING CONCRETE PANELS

This application is a continuation-in-part of co-pending U.S. application Ser. No. 126,192, filed Mar. 3, 1980 now U.S. Pat. No. 4,298,413.

BACKGROUND OF THE INVENTION

This invention relates to a method for producing fabric-reinforced thin concrete panels. Such panels are described in U.S. Pat. No. 3,284,908, Paul E. Dinkel, and comprise a core of lightweight concrete with a surface layer of fabric secured to each face by means of a thin layer of hydraulic cement composition. The panels normally are ⅜ inch to ⅝ inch thick and are used in construction as a backer for ceramic tile, exposed aggregate, thin brick and other functional or decorative materials.

These thin concrete panels conventionally have been produced in individual molds of suitable size or other forms on a conveyor belt or on a forming table.

In the prior art, the methods employed tend to be labor intensive in that each form must be turned over or otherwise handled, to release its panel, then must be cleaned, treated with release agent and transported back to the beginning of the production cycle. The forms take up space in the curing racks as well as in the plant in general, and require equipment for dumping and for transporting the forms back to the beginning of the process.

The present invention relates to a method for forming such fabric-reinforced panels in a continuous operation on a conveyor belt but employing a web of thin carrier/release material under the panels thereby eliminating the use of molds, plates or other forms. In particular, this co-pending application relates to the use of a paper web as the carrier/release material and to the removal in the curing operation of excess water in the panels.

SUMMARY OF THE INVENTION

In the present invention a novel method has been found for producing fabric-reinforced, thin, lightweight concrete construction panels on a continuous basic, which eliminates the use of molds, plates or other forms as well as the equipment for handling the forms. The panels comprise a layer of reinforcing fabric bonded by means of a layer of a hydraulic cement slurry to the top and bottom surfaces of a core of lightweight aggregate and hydraulic cement. In a preferred embodiment of the invention the reinforcing fabric is a woven mesh of glass fiber yarns coated with a protective material such as polyvinyl chloride resin. I have found that the molds or the like can be eliminated by using a thin web of a disposable carrier/release material such as paper coated with a release agent, if also the individual panels are stacked at the end of the forming operation by means of an air-float unit of novel design. The carrier material is laid down on the conveyor belt at the beginning of the forming section, the components of the panel are then deposited on the carrier material, the continuous green, uncured strip so formed is cut into individual panels, and the panels are then stacked for curing. However, the freshly formed green panel, as well as its sheet of disposable carrier material, is soft, limp and tender and easily disrupted and therefore does not lend itself to conventional stacking operations. But with my airfloat unit the stacking of the freshly formed panels is achieved successfully.

The air-float unit consists of an air-frame with an air-film cover which is divided into two slidable halves, an opening in said frame slightly larger in dimensions than the panels delivered to it, an adjustable lift table positioned beneath said opening to receive the panels and form a stack, and a number of open orifices positioned in the walls of said opening which orifices are supplied with high-volume, low-pressure air. A cushion of air is trapped by the walls of the frame, by the stack below and the two covers and the panel being stacked.

As will be apparent my air-float stacking unit can be used to stack not only the uncured fabric-concrete composite panels but also other similar limp or soft, flat objects which are difficult to stack without damaging or destroying such.

In the stacking operation each panel is transferred onto the cover of the airframe while floated by an air-film, the two halves of the cover are moved apart, and the panel together with its carrier sheet eases down or settles on to the stack while supported by the trapped air-cushion. With the air-cushion, at most, only a slight bending of the panel occurs, insufficient to disrupt the layers. The freshly formed panels are sufficiently supple that even if a slight bowing occurs in a panel it will flatten out upon the panel or pallet board beneath it on the lift table.

The production of fabric-reinforced concrete panels by means of my invention has very substantial advantages over prior methods. Once the panels are stacked at the end of the production line, as in a stack of ten or twenty five panels, or other number as desired, they need not be handled individually until they reach the user. The stack of panels is moved as a unit into the curing area and held until the curing of the panels is sufficiently complete, then moved to the banding area where runners are, or a pallet is, positioned under the stack and steel strapping or other banding applied, and finally moved into the warehouse or shipping area.

It is an object of this invention to simplify the process for producing fabric-reinforced concrete panels.

It is a further object of this invention to eliminate the use of forms, such as molds, plates, etc., in the process, and the need for certain steps in the process, for producing fabric-reinforced concrete panels.

It is a further object of this invention to provide an improved method of curing such concrete panels in a stack, employing a water-absorbent paper web as a carrier.

It is a further object of this invention to reduce the amount of handling of the panels and the amount of labor required thereby reducing the cost of manufacture.

DESCRIPTION OF THE PRIOR ART

U.S. Pat. No. 3,284,980 (Dinkel) describes a method of forming fabric-reinforced thin concrete panels by successively depositing the several layers in a form or mold and allowing the panel to cure in the mold. The panels must then be removed from the molds, as by over-turning, and stacked or otherwise arranged for shipping. This involves considerable labor in dumping the molds, cleaning them and applying a concrete release agent to the casting surfaces. It involves a slow and cumbersome operation.

U.S. Pat. No. 3,509,010 (Metzger) describes a method of producing a construction panel made up of a layer of expanded clay particles and hydraulic cement with a covering of sheet metal or a covering of fabric, preferably a glass fiber mat, bonded to one or both sides of the layer. In the disclosed method the composite of glass fiber mat and layer of expanded clay and hydraulic cement is formed in a continuous strip, then cured and hardened and finally cut into pieces. This reference discloses nothing concerning stacking of freshly formed panels or the use of a separator/carrier sheet between panels.

U.S. Pat. No. 3,608,003 (Klaue and Metzger) describes a method and apparatus for producing lightweight construction panels composed of a layer of expanded aggregate and hydraulic cement, covered on one or both faces with a mat of glass fibers impregnated with hydraulic cement. However, the panels are formed in a mold, the molds being moved on a roller conveyor under a forming station. The molds must then be stacked for curing, unstacked and emptied after the panels are hardened, and returned to the roller conveyor. This is an efficient operation which requires considerable excess equipment in the way of tracks, carriages, lifting devices and the like for handling the molds. The stacking of uncured, limp concrete panels is not disclosed.

U.S. Pat. No. 4,112,173 (Roudebush and Thompson) discloses the use of polyethylene coated paper and paperboard as a liner in the casting of tilt-up concrete slabs where one slab is cast in place of one top of another. The casting sheet provides easy release of one concrete slab from another when medium or high density polyethylene is used. This patent does not pertain to the handling of thin, uncured panels.

U.S. Pat. No. 4,159,361 (Schupack) discloses a fabric-reinforced concrete panel and a method of making the same in which the panels are formed one on top of the other from a reciprocating fabrication train, see FIG. 6 and FIG. 7 and columns 6 and 7. A bond release curing agent is sprayed over the top surface of one panel before the next panel is formed on it.

While these prior art references disclose the production of fabric-reinforced concrete panels none of them discloses forming the panels on a disposable carrier sheet in a continuous operation and transferring the cut, freshly formed panels to a stack for curing and subsequent shipping. Further, none of the references relate to the use of an air cushion for achieving the stacking of the soft, limp, freshly formed panels.

DETAILED DESCRIPTION OF THE PREFERRED EMBODIMENTS

Figure 1:
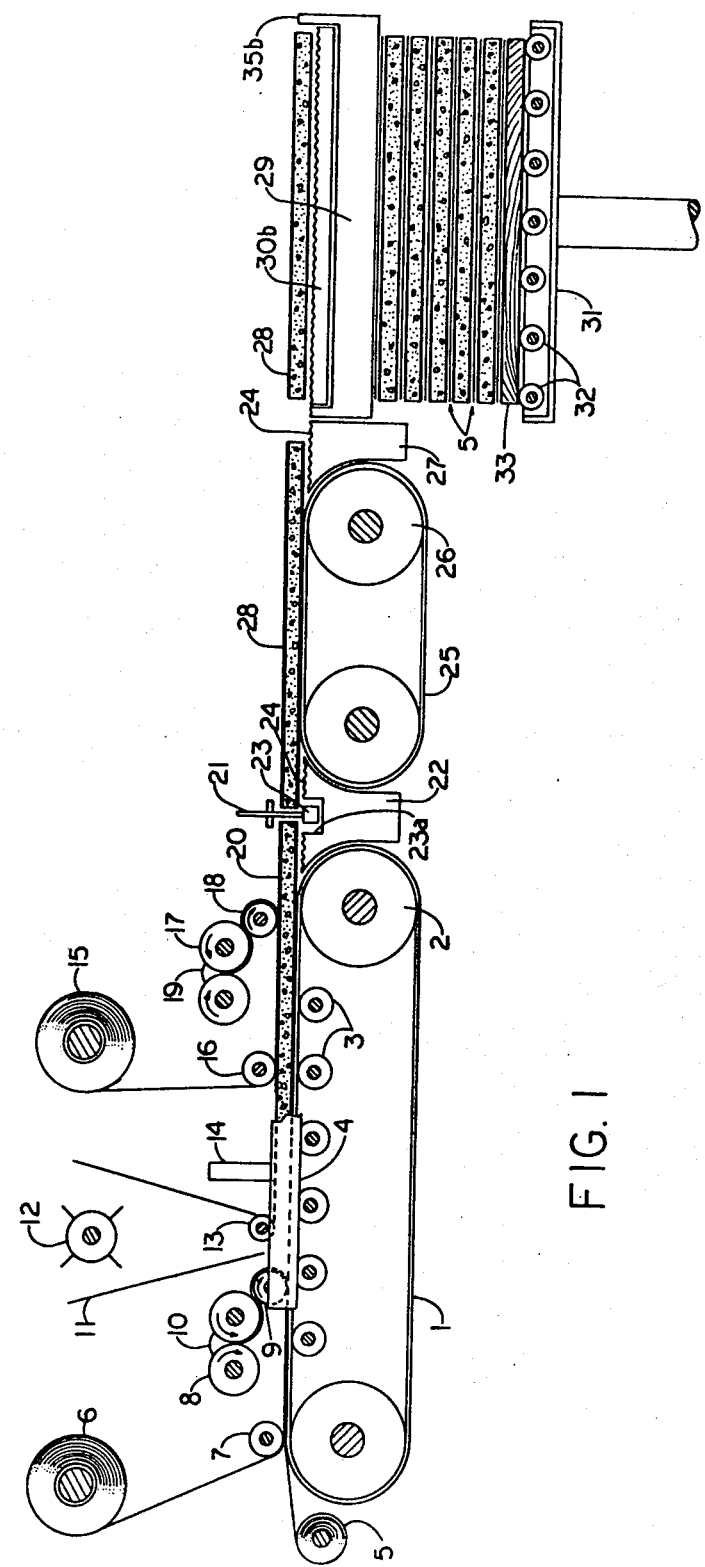
FIG. 1 is a schematic front elevation view showing a preferred embodiment of the apparatus according to the present invention.

Referring to FIG. 1, the forming station comprises a continuous conveyor belt, driven by one of the belt rollers 2, suitably supported by table rolls 3 or the like, side rails 4 which serve to form the edges and determine the thickness of the concrete strip 20 being formed, a pair of nip rolls 8 which, together with end dams (not shown), and a transfer roll 9, serve to apply a controlled layer of portland cement slurry 10, chute 11 together with distributor wheel 12, and compaction roller 13 serve to feed a uniform layer of core mix onto the conveyor, reciprocating screed 14 which serves to smooth and provide the final control of the thickness of the core layer, and a second pair of nip rolls 17, together with end dams (not shown) and transfer roll 18, serve to apply the top layer of portland cement slurry 19 to the concrete strip 20, being formed.

A cutting station, shown in FIG. 1, consists of an air-film transfer table 22, a reciprocating cutter 21, and a replaceable cutting bed or block 23. The air-film transfer table 22, is provided with a number of counter-sunk orifices 24, spaced a few inches apart across its entire working surface and is supplied with a high volume flow of low-pressure air by means of a centrifugal blower (not shown). This unit through its orifices 24, provides an air-film which serves to support the fabric-reinforced concrete strip and the cut panels as they are transferred from belt 1 to belt 25.

Such air-film tables are supplied by various manufacturers, for example Southworth Machine Co. of Portland, Maine. The diameter of the orifices 24, their spacing and the flow of air will vary according to the size and weight of the panel being conveyed. In a typical installation the orifices are 3/16 inch in diameter, counter-sunk and spaced 4 inches on center. The pressure of the air stream normally is 1 to 2 p.s.i.

The cutter 21, can be a rotating disc or a blade and preferably is operated as a traveling shear or cutter, that is moving diagonally across the moving strip, so as to sever panels with a right angle cut.

The cutter is indexed by electronic controls to cut the strip at certain intervals and can be set to cut panels of any desired length.

Block 23 serves as a non-abrasive cutting bed and has a surface of hardwood, high durability plastic or the like. It is held in the recess 23a by means of a friction fit or other easily releasable means so that it can be replaced very quickly when the surface becomes worn. Block 23 is held to a narrow width to minimize the surface taken from the air-film table.

Conveyor belt 25, driven by roller 26, serves as a transfer mechanism to deliver the individual panels from the cutting station to the stacking unit. The transfer operation is augmented by air-float unit 27, similar to table 22. Its working surface is provided with a large number of orifices 24, preferably counter-sunk, and supplied with a high volume flow of low-pressure air. An air-film is provided under the panel to float it across to the stacking unit.

Alternatively a second transfer belt and air-film table, similar to conveyor 25 and unit 27, but not shown, can be used; it would be intermittently operated faster than belt 25 to speed up delivery of a panel to the stacking device and then slowed to the speed of belt 25 to receive the next panel. Normally this transfer section is longer than the first one in order to facilitate the speed changes.

The air-float stacking unit consists of an adjustable lift table 31 and an air-frame 29; two sliding covers 30a and 30b of the air-frame 29 form an air-film table which receives the panels to be stacked. The stacking device is shown in detail in FIG. 2, FIG. 3 and FIG. 4.

Figure 2:
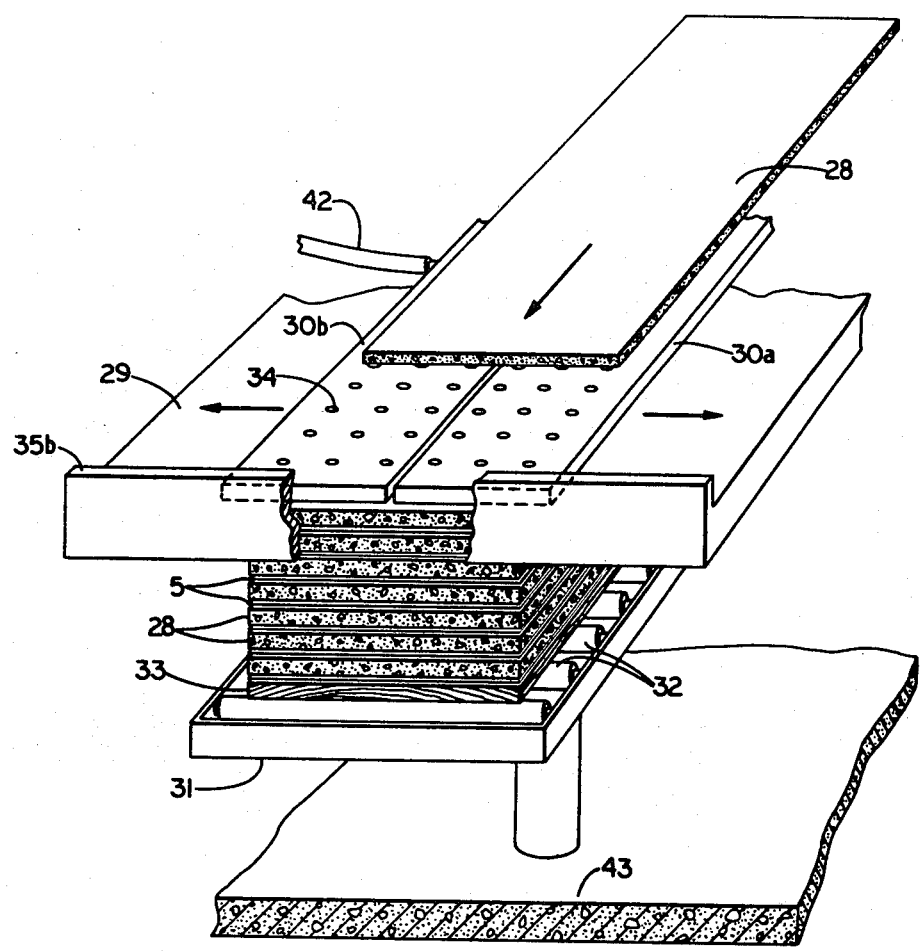
FIG. 2 is a perspective view of the air-float stacking unit of the present invention illustrating its operation.
Figure 3:
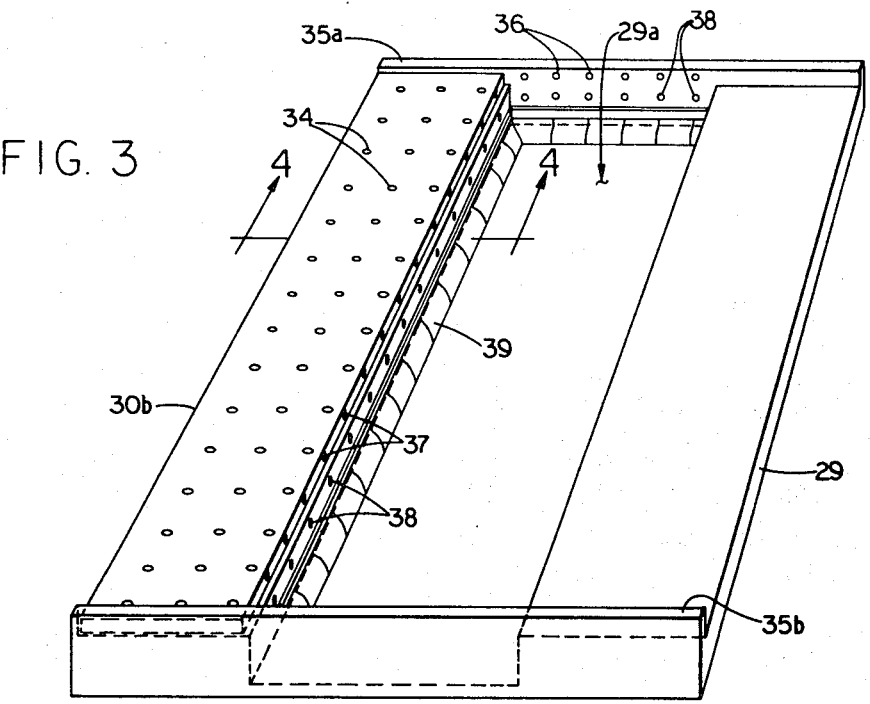
FIG. 3 is a perspective view in part of the air-frame of the stacking unit shown in FIG. 2.

As shown in FIG. 2 and FIG. 3, air-frame 29 has an opening 29a the shape of the panel being produced and slightly larger in length and width than the size of the panel with only a minimum clearance around the four edges of the panel. A large number of orifices 38 are provided along at least one pair of the opposing walls of the opening and preferably along all four of the walls. These orifices are placed close to the top of each such wall of the opening, as per FIG. 4.

Additionally, an inwardly arched baffle 39 is attached along the length of each of the four walls of the opening to form a seal around the edges of the stacked panels or of the pallet board 33. The baffles are of spring steel or other suitable metal or plastic such as will permit them to remain in firm, flexed contact against the edges of the stacked panels despite the air pressure used to cushion the stacking of the panels.

Air-frame 29 is provided with an air-film table comprised of two covers 30a and 30b whose upper surfaces are equipped with orifices 34 fairly closely spaced, for example, 3 inches to 5 inches apart. High-volume low-pressure air is supplied as through tubing 42 to the orifices thereby creating an air-film under each panel 28 as it is transferred to the stacker. The two covers are slidable, one to each other. Initially the two covers are closed; when delivery of a panel 28 to the air-film table is completed the two covers are moved apart quickly to settle the panel, cushioned by the trapped air layer, on to the stack or pallet board 33 as the case may be. The open position, with only one cover half shown, is illustrated in FIG. 3.

Frame 29 is provided with a rail 35a at the entry end of the stacking unit and rail 35b at the opposite end. These two rails serve as guides for the covers 30a and 30b. The top edge of rail 35a is flush with, or slightly below, the top of the two covers, but rail 35b extends above the top surface of the covers, serving when needed, as a back stop for an arriving panel.

Alternatively, the two rails 35a and 35b are equipped with orifices 36, fed with pressurized air to augment the air cushion under the panel when the two covers are withdrawn to the opposite sides of the frame. Flow of the air to the orifices can be initiated when the electronic signal to open the covers is actuated.

The two covers 30a and 30b are provided with orifices 37 on the inside edge of each, suitably supplied with pressurized air. The air is turned on when needed to provide added air support along the center line of a panel as the covers are moved apart.

The pressurized air fed through orifices 37 and 38, not only augments the air layer under covers 30a and 30b and the panel, but also provides air seals along the rails and under the covers, to reduce the escape of the air cushion from inside the air-frame.

A separate set of orifices (not shown) located on the bottom surface of covers 30a and 30b can be used to provide an air seal under said covers.

Figure 4:
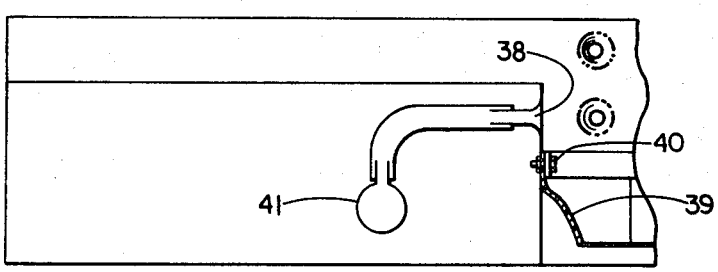
FIG. 4 is a sectional elevation taken along the line 4—4 in FIG. 3.

The number of orifices, their size and spacing and the volume of air supplied will vary according to the weight of the panels or other flat objects being transported and stacked. In general, the orifices are open holes from 1/16" to ¼" in diameter, counter-sunk, for example 3/8", to provide a puddle of air at each orifice, spaced as needed, for example 4" on center. The orifices, as number 38 in FIG. 4 are fed from a manifold 41 which in turn is supplied from a high-volume centrifugal air blower (not shown). A low air pressure of about one-half to two pounds per square inch at the orifice normally is adequate. However, where an air sealing action is needed as at orifices 36 along rails 35a and 35b and at orifices 37 along the edge of covers 30a and 30b to prevent bowing of the panel, higher pressures may be required.

The air cushion which serves to lower the uncured panels on to the stack without damage consists of the air trapped between the top surface of the stack (as the top of a previously deposited panel or the top of pallet board 33) and the bottom of a panel being deposited on the stack. As can be visualized from FIG. 3 and FIG. 4, the cushion of air between the top of the stack and the bottom of the next panel, is maintained by the high volume flow of air from orifices 38 while being confined by the four walls of the opening 29a in the airframe, the baffles 39 which bear upon the four edges of the stacked panels and thereby act as air seals, and as needed, by the air jets from orifices 36 on the inside of rails 35a and 35b and orifices 37 on the inner edge of each of the two covers 30a and 30b. The lift table 31 is operated to hold the distance between the top of the stack and the bottom of covers 30a and 30b at a minimum, only a small fraction of an inch. When a panel 28 is to be deposited upon the stack the covers 30a and 30b are opened quickly to minimize escape of the air cushion.

The foregoing described arrangement of orifices in the stacking device provides the means for adjusting the air cushion to handle panels of different weights and different degrees of stiffness (or lack of stiffness). The air cushion is adjusted to support the panel first along the center line as the two supporting covers are withdrawn, minimizing the tendency of the panel to bow or sag. Next the flow of air from the various orifices must be adjusted to provide a substantially uniform support under the panel, but not sufficient to prevent the settling of the panel on to the stack. Thus, in the operation of the stacker, a balance is established between inflow and outflow of air in the air-frame such that the rate of escape of the air is slightly in excess of the flow of air supplied by the various orifices.

In the operation of the preferred embodiment of my process (see FIG. I), a web of disposable carrier material 5 is fed on to moving conveyor belt 1, a web of reinforcing fabric 6 passes under spreader roll 7 and is laid on the disposable carrier material, a layer of portland cement slurry is applied to the fabric by means of transfer roll 9 which in turn is supplied from a pool of slurry 10 held between two nip rolls 8, a core mix of lightweight aggregate, portland cement and water, of a no-slump consistency is dropped from a conveyor belt (not shown) along distributor wheel 12 extending between the side walls (not shown) of chute 11, which scatters a more or less even layer of mix between side rails 4 and is compacted and leveled as it passes under roll 13, and, if further leveling is needed, is screeded by reciprocating bar 14, a second web of reinforcing fabric 15, which may be the same fabric as 6, or may be a different material depending upon the panel properties desired, is laid on top of the core mix, a top layer of portland cement slurry is applied to the fabric 15 by means of transfer roll 18 to cover the fabric and bond it to the core layer, the thus-formed strip 20 including the disposable carrier web is cut on signal to sever a panel of desired length, while supported by an air-film, the panel is transferred to an air-film table formed of two sliding covers 30a and 30b, the panel while supported by an air cushion confined by an airframe 29, is stacked upon an adjustable lift-table 31, said air cushion serving to hold the panel substantially in a horizontal plane as it settles on to the stack, the stack of panels is transferred to a curing operation.

The air-film and air cushion thus make it possible to convey and to stack a wet, uncured panel without the need of a rigid support such as a mold, plate or other form. As the two covers 30a and 30b of the stacker are drawn apart, the air-film from the surface orifices allows movement of the covers without any abrading or tearing action on the bottom of the panel or its disposable carrier web. The air cushion minimizes bowing in the center of the panel thereby avoiding impairment of the panel as it is deposited on the stack.

The web of disposable carrier release material can be a web of paper treated with a release agent such as a silicone, a Werner complex, a fatty acid compound or the like, suitable for concrete form release, or a web of paper coated on one or both sides with polyethylene or polypropylene, or a thin film of plastic per se having release properties, such as 2 mil or 2½ mil polyethylene, Teflon (tetrafluoro-ethylene) and polypropylene. A web of well sized kraft paper or of wet strength kraft paper of a basis weight in the range of 30 to 60 pounds, treated with a fatty acid type concrete release compound such as "Nox-Crete" brand form coating, produced by the Nox-Crete Chemical Co. of Omaha, Nebr., on both surfaces, is preferred. The release compound advantageously is applied by passing the web between two release agent applicator rollers as it is being fed to the conveyor belt.

The web of carrier material 5 is of a width greater than the panel being produced, having a narrow exposed strip on each side. The excess web on each edge travels under the side rails 4 which are suitably spaced above the conveyor belt to provide clearance for the web. The web of disposable material serves a dual function, first as a carrier for the concrete strip as it is formed on the conveyor belt and cut, and for the panels as they are transported and stacked, and second, as a separator sheet between the panels to permit, after curing, the release of the one panel from another as they are taken from the stack by the user. The excess width of the web facilitates separating the panels.

It has been found that the use of a web of paper as the disposable carrier provides an additional advantage in that it facilitates removal of unwanted water. In the forming of the continuous strip of fabric-reinforced concrete the amount of water used in the portland cement slurry is in excess of that required to hydrate the portland cement; a relatively large amount of water is used in the slurry to provide the proper flow properties. Also although a relatively dry core mix is used the amount of water in the mix may be in excess of that required to hydrate its portland cement content.

After the panels have hardened in the curing operation and have developed suitable strength, the excess water in the panels becomes unwanted. While this excess water, usually present as absorbed moisture, can be removed by a subsequent drying operation this requires unstacking of the panels from the curing operation and processing of the panels one by one through a drying chamber or the like at considerable expense. Where such concrete panels are stacked one on top of the other as they are removed from a mold or carrier plate after hardening, as described in the prior art, the excess water remains trapped. The top one or two panels and the edges of the panels may dry out while the stack is held in a room, but the excess water will be retained in and between the panels indefinitely. Consequently, heretofore drying of the panels one by one has been necessary.

I have found by using a web of paper as the disposable carrier and thus providing a layer of paper between adjacent panels as they are stacked for curing, that most of the excess water can be removed without unstacking the panels. The green, uncured panels as they leave the cutting station are stacked on a pallet board, and the stack is then held in a curing area, preferably enclosed or the stacks covered with a water-proof cover to retain the moisture, for one or more days to permit the portland cement to hydrate sufficiently for the panel to harden and gain the majority of its strength. The stack of panels can be retained in the non-drying curing area for as long as desired inasmuch as concrete continues to gain strength for 28 days or longer. In my process normally the panels need to be retained under non-drying conditions only for one or two days.

The stacks of panels are then left in an area where the moisture can dissipate. This area can be an open room or a closed chamber and the air can be heated or unheated and can be circulated as desired. However, my process lends itself to air drying at ambient conditions. The layer of paper between adjacent panels absorbs the excess water and due to its wicking action permits the water to move out to the edges and dissipate into the air. While not all of the excess water will be so dissipated the most of it will be thus removed over a period of days. Sufficient water can be removed to bring each panel substantially into equilibrium with ambient conditions.

The term "water-absorbent paper" is used herein to designate conventional paper and paperboard produced from chemical wood pulps, semi-chemical wood pulps, ground wood pulp and the like of a cellulosic nature, as well as those papers and paperboards produced from man-made fibers which are as water absorbent as cellulosic pulps. The term excludes papers and paperboards produced from the non-water absorbent fibers such as nylon and conventional polyethylene and polypropylene.

The amount of concrete release agent applied to the paper must be regulated so as to not impair significantly the water absorptive properties thereof.

A light layer of a set-off material, such as a fine sand or fine plastic particles, spread over the top surface of the panels prior to being stacked, as at the transfer station or at the stacking station, can be used to facilitate separation of the cured panels.

The reinforcing fabric in the preferred embodiment is a web of woven glass fiber yarns. The yarns are coated with a polyvinyl chloride resin or other protective thermoplastic polymer, woven and then heat set. The fabric must be sufficiently open to permit the portland cement slurry to penetrate and bond the fabric to the core. Typically the glass fiber mesh used is a 18×14 or 21×12 yarn count per inch. Other high strength fabrics such as one of nylon filaments or a vinyl coated polyester yarn mesh can be used.

Although various hydraulic cements can be used, in the preferred embodiment of this invention portland cement is used. Any conventional lightweight aggregate such as expanded shale, clay and slag, volcanic ash, cellular ceramic spheres, and the like, can be used. However, expanded shale appears to have the best properties for the panels described herein.

The lift-table 31 is shown in the figures as a hydraulic elevator, but this is by way of example; the lift can be a scissor table or other unit which can be indexed up or down to receive the panels.

In the stacking operation a pallet board 33, i.e., a flat sheet or plate of plastic, wood or metal, is laid on the top of the lift-table 31 to provide a flat support. After the desired number of panels has been accumulated in the stack, the lift-table is lowered to the level of a take-away conveyor, folk lift or the like and the stack is transported to a curing area. When the panels are hardened, or at any other suitable point in the process, the stack is conveyed to a banding station where it is turned over as a unit onto runners (two or more) or on a pallet, the board 33 is removed and the stack is strapped to the runners or a pallet ready for further curing, warehousing or shipping.

While the process is a continuous one in the sense that the flow of material and product can be continuous there may be momentary interruptions in the flow, as when a cut is made in the continuous strip or when the cover members on the air-frame are opened and closed as a panel is stacked.

The orifices 34 on the top of the air-film table covers 30a and 30b are arranged in two or more banks in each cover and are equipped to be operated independently or in concert. These banks provide a means of controlling the speed of a panel as it is delivered to the air-film table. The volume of air furnished to the banks of orifices can be adjusted to provide a diminished flow in any area to control the forward movement of a panel. With a reduced air-film under the panel a braking action is obtained. As an example, the banks at the far end of the covers, nearest rail 35b, can be operated at a lower volume of air than the banks as the receiving end of the air-film table, to slow the forward movement of the panel. Alternatively, the flow of air to all of the orifices can be maintained at the normal level until the delivey of a panel is substantially completed at which time the air flow is cut off to arrest the forward movement of the panel. The air flow to the orifices 34 is then resumed for the stacking step.

What is claimed is:

1. A process for producing fabric-reinforced concrete panels which comprises depositing on a moving conveyor belt a web of water-absorbent paper treated with a concrete release agent, depositing on said paper web a continuous strip of uncured, fabric-reinforced concrete, cutting said strip including said paper web into panels, stacking said uncured panels with a layer of said paper web between adjacent panels, curing said stack of panels under non-drying conditions until said panels have hardened, and subsequently subjecting said stack of hardened panels to air drying at ambient conditions whereby moisture from within said stack is dissipated through the wicking action of said layers of paper.

* * * * *